United States Patent
Ohata

(10) Patent No.: US 11,939,507 B2
(45) Date of Patent: Mar. 26, 2024

(54) LIQUID CRYSTAL POLYMER POWDER AND METHOD OF PRODUCING THE LIQUID CRYSTAL POLYMER POWDER

(71) Applicant: Murata Manufacturing Co., Ltd., Nagaokakyo (JP)

(72) Inventor: Hiroyuki Ohata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 112 days.

(21) Appl. No.: 17/698,314

(22) Filed: Mar. 18, 2022

(65) Prior Publication Data
US 2022/0204848 A1 Jun. 30, 2022

Related U.S. Application Data

(63) Continuation of application No. PCT/JP2020/035732, filed on Sep. 23, 2020.

(30) Foreign Application Priority Data

Sep. 25, 2019 (JP) .................. 2019-173858

(51) Int. Cl.
| | |
|---|---|
| *C09K 19/02* | (2006.01) |
| *C08J 3/12* | (2006.01) |
| *C09K 19/38* | (2006.01) |
| *C09K 19/52* | (2006.01) |

(52) U.S. Cl.
CPC .............. *C09K 19/02* (2013.01); *C08J 3/12* (2013.01); *C09K 19/38* (2013.01); *C08J 2300/12* (2013.01); *C09K 2019/523* (2013.01)

(58) Field of Classification Search
CPC .... C09K 19/02; C09K 19/38; C09K 19/3804; C09K 2019/0444; C09K 2019/523; C08J 3/12; C08J 2300/12
See application file for complete search history.

(56) References Cited

U.S. PATENT DOCUMENTS

| | | |
|---|---|---|
| 2003/0087077 A1 | 5/2003 | Samuels |
| 2015/0294754 A1 | 10/2015 | Ohata |
| 2015/0299405 A1 | 10/2015 | Ohata |
| 2022/0204848 A1* | 6/2022 | Ohata .................. C08J 3/12 |
| 2023/0002548 A1* | 1/2023 | Ohata .................. B29B 13/10 |
| 2023/0416987 A1* | 12/2023 | Morimoto ............. D21F 11/02 |

FOREIGN PATENT DOCUMENTS

| | | |
|---|---|---|
| JP | H09157499 A | 6/1997 |
| JP | 2003193387 A | 7/2003 |
| JP | 2005501760 A | 1/2005 |
| JP | 2008050715 A | 3/2008 |
| JP | 2014144410 A | 8/2014 |
| JP | 5904307 B2 | 4/2016 |
| WO | 2014109199 A1 | 7/2014 |
| WO | 2014188830 A1 | 11/2014 |
| WO | 2017150336 A1 | 9/2017 |

OTHER PUBLICATIONS

International Search Report in PCT/JP2020/035732, dated Nov. 24, 2020, 2 pages.

* cited by examiner

*Primary Examiner* — Geraldina Visconti
(74) *Attorney, Agent, or Firm* — ArentFox Schiff LLP

(57) ABSTRACT

A liquid crystal polymer powder that includes a fiber portion having fibrous liquid crystal polymer particles with an aspect ratio of a length in a longitudinal direction thereof to a fiber diameter of 10 times or more. In the liquid crystal polymer powder, an average diameter of the fiber portion is 1 μm or less, and a content of a substantially unfiberized lump portion is 20% or less.

5 Claims, 8 Drawing Sheets

AGGREGATION PORTION

AGGREGATION PORTION

LIQUID CRYSTAL POLYMER POWDER AND METHOD OF PRODUCING THE LIQUID CRYSTAL POLYMER POWDER

CROSS REFERENCE TO RELATED APPLICATIONS

The present application is a continuation of International application No. PCT/JP2020/035732, filed Sep. 23, 2020, which claims priority to Japanese Patent Application No. 2019-173858, filed Sep. 25, 2019, the entire contents of each of which are incorporated herein by reference.

FIELD OF THE INVENTION

The present invention relates to a liquid crystal polymer powder and a method of producing the liquid crystal polymer powder.

BACKGROUND OF THE INVENTION

Prior art documents disclosed for liquid crystal polymers include Japanese Patent Application Laid-Open No. 2003-193387 (Patent Document 1), Japanese Patent Application Laid-Open (Translation of PCT Application) No. 2005-501760 (Patent Document 2), Japanese Patent Application Laid-Open No. 2008-50715 (Patent Document 3), and Japanese Patent No. 5904307 (Patent Document 4).

Patent Document 1 describes a method of producing a microfibrillated product of a rigid chain aromatic synthetic polymer, in which a pellet-like rigid chain aromatic synthetic polymer is subjected to a mechanical treatment in a water suspension state until a weight average fiber length of the rigid linear aromatic synthetic polymer is 1.6 mm or less, preliminarily beaten, and then homogenized. It is described that examples of the rigid chain aromatic synthetic polymer include aromatic polyamides represented by poly(p-phenylene terephthalamide) and aromatic polyesters of liquid crystal polymers represented by poly(p-hydroxybenzoic acid).

Patent Document 2 describes a grinding method for forming small particles of an anisotropic thermotropic liquid crystalline polymer from larger particles. It is described that the grinding method includes: (a) a first grinding stage of grinding the anisotropic thermotropic liquid crystalline polymer in a first grinding apparatus; (b) removing the anisotropic thermotropic liquid crystalline polymer from the first grinding apparatus; (c) a second grinding stage of grinding the anisotropic thermotropic liquid crystalline polymer from (b) in a second grinding apparatus; and (d) removing the anisotropic thermotropic liquid crystal polymer from the second grinding apparatus. It is described that if an LCP (Liquid Crystal Polymer) is anisotropic, when small enough particles are produced they will be fibrous. It is described that at least about 90 weight percent of a product of (d) passes through a 60 mesh screen. The opening of the 60 mesh screen is about 0.27 mm.

Patent Document 3 describes a method of producing microfibers containing a solvent at a ratio of 0.1 to 20% by weight with respect to the entire fibers, in which (1) an average fiber length (L) is 0.01 to 1 mm, (2) an average fiber diameter (D) is 0.001 to 1 μm, and (3) a ratio (L/D) of the average fiber length (L) to the average fiber diameter (D) is 1000 to 10000, the method of producing microfibers including dispersing fibers in the solvent, microfibrillating the fibers with a mechanical shear force, and then drying the fibers. It is described that the fiber is selected from the group consisting of aromatic polyamide-based fibers and polyarylate-based fibers.

Patent Document 4 describes a method of producing a fibrillated liquid crystal polymer powder containing fibrillated liquid crystal polymer particles. The production method includes a grinding step and a fibrillating step in this order. In the grinding step, a biaxially-oriented liquid crystal polymer film is ground to obtain a liquid crystal polymer powder. In the fibrillating step, the liquid crystal polymer powder is crushed by a wet high-pressure crushing device to obtain the fibrillated liquid crystal polymer powder. In the grinding step, grinding using a freeze grinding method is performed. It is described that grinding using the freeze grinding method refers to grinding an LCP film or the like in a frozen state. It is described that in order to grind a liquid crystal polymer in a frozen state, it is possible to roughly grind a tape-like film made of a liquid crystal polymer, for example, and feed it into a grinding device sequentially while pouring liquid nitrogen thereon.

SUMMARY OF THE INVENTION

In recent years, research and development of fine fibers have been actively conducted. The fine fiber is, for example, a fiber having a fiber diameter of 3 μm to 5 μm. Examples of the material constituting the fine fibers mainly include cellulose. Cellulose forms, for example, a cell wall of a plant as an aggregate. Fine fibers made of cellulose can be obtained relatively easily by physically or chemically destroying and defibrating an aggregate of cellulose.

However, cellulose is a polysaccharide and contains a large number of hydroxyl groups, and therefore has extremely high hygroscopicity. This causes a problem when fine fibers made of cellulose are used as an electronic material such as a material constituting a part of a circuit board. Specifically, there occur a problem that electrical characteristics change as the fine fibers absorb moisture, and a problem that a dimension of a member composed of the fine fibers changes as the fine fibers absorb moisture or dry.

Thus, the inventor of the present application has studied a liquid crystal polymer as a material constituting fine fibers that can be suitably used as an electronic material. This is because the liquid crystal polymer has low hygroscopicity. In addition, from the viewpoint of production cost and the like, the inventor of the present application has studied to form fine fibers using a liquid crystal polymer that is not a fibrous material as a raw material.

In an electrospinning method which is one of methods of producing fine fibers, it is necessary to dissolve a raw material for forming fine fibers in a solvent. However, it is impractical to make a liquid crystal polymer into fine fibers by an electrospinning method, and practicality is low from the viewpoint of mass production.

In a meltblowing method which is one of the methods of producing fine fibers, a material to be made into fine fibers is melted, and the melted material is discharged from a nozzle. By applying hot air to the melted material discharged from the nozzle, the material is stretched. However, a liquid crystal polymer has a low melt tension. Thus, when the liquid crystal polymer is to be made into fine fibers by the meltblowing method, the liquid crystal polymer is cut before being sufficiently stretched. Thus, in the meltblowing method, an average diameter of a fiber portion cannot be reduced to about 3 μm or less.

For example, in Patent Document 1, a pellet-like liquid crystal polymer is used as a raw material. The pellet-like liquid crystal polymer is uniaxially aligned and has very strong anisotropy. When the pellet-like liquid crystal polymer having strong anisotropy is subjected to mechanical treatment in a water suspension state and preliminarily beaten, grinding by a mode divided along an alignment axis of molecules preferentially occurs. As a result, a fibrous raw material powder having a large aspect ratio is obtained. Even if an attempt is made to crush a fibrous raw material powder having a large aspect ratio into a fiberized liquid crystal polymer having an average diameter of 1 µm using a homogenizer (wet high-pressure crushing device), clogging at the nozzle frequently occurs, and the fibrous raw material powder cannot be crushed. Patent Document 1 does not describe the fiber diameter of a fibrillated material of the obtained liquid crystal polymer.

For example, Patent Document 2 does not describe that the obtained LCP is a fine fiber having an average diameter of 1 µm or less.

For example, in Patent Document 3, it is necessary to use a fibrous raw material in order to obtain microfibers. A content of a lump-shaped liquid crystal polymer in the entire fiber described in Patent Document 3 is not specified.

For example, in Patent Document 4, since a surface of the liquid crystal polymer powder is fibrillated, most particles constituting the liquid crystal polymer powder are agglomerated.

The present invention has been made in view of the above problems, and an object of the present invention is to obtain a microfibrous liquid crystal polymer powder which does not use a fibrous raw material and has a low content of a lump portion or does not contain the lump portion.

A liquid crystal polymer powder according to the present invention includes a fiber portion having fibrous liquid crystal particles with an aspect ratio of a length in a longitudinal direction thereof to a fiber diameter of 10 times or more. In the liquid crystal polymer powder, an average diameter of the fiber portion is 1 µm or less, and a content of a substantially unfiberized lump portion is 20% or less.

A method of producing a liquid crystal polymer powder according to the present invention includes a fine grinding step and a fiberizing step. In the fine grinding step, a coarse liquid crystal polymer is ground in a state of being dispersed in liquid nitrogen to obtain a granular finely ground liquid crystal polymer. In the fiberizing step, the granular finely ground liquid crystal polymer is crushed by a wet high-pressure crushing device to obtain the liquid crystal polymer powder.

According to the present invention, it is possible to obtain a microfibrous liquid crystal polymer powder having a low content of a lump portion without using a fibrous raw material.

DETAILED DESCRIPTION OF THE INVENTION

<Liquid Crystal Polymer Powder>

Figure 1:
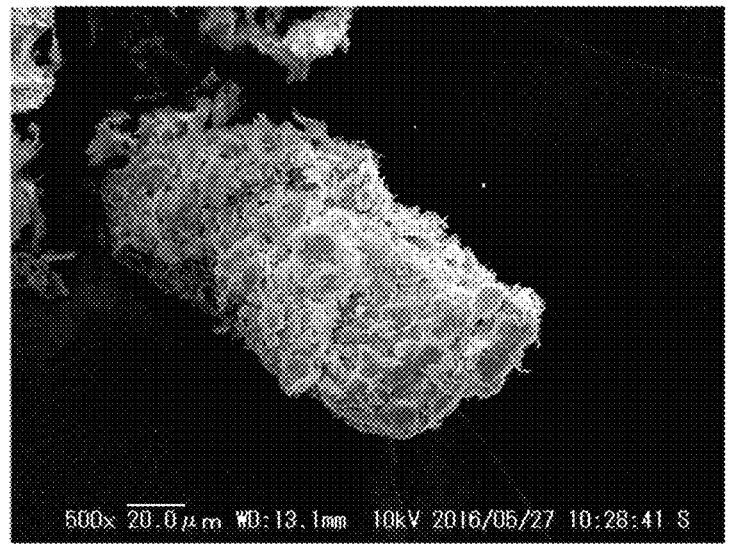
FIG. 1 is a photograph of a finely ground liquid crystal polymer after being ground in a fine grinding step in Example 1.

Hereinafter, a description will be given of an embodiment of the present invention. First, a liquid crystal polymer powder according to an embodiment of the present invention will be described. The liquid crystal polymer powder according to an embodiment of the present invention includes a fiber portion and a lump portion. The fiber portion may be contained as an aggregation portion in which fibrous particles are aggregated in the liquid crystal polymer powder, and the lump portion may be contained as an aggregation portion in which lump particles are contained and aggregated in a liquid crystal polymer. The liquid crystal polymer powder according to the present embodiment may not include the lump portion.

The fiber portion includes fibrous particles. In the present embodiment, the fibrous particle is a liquid crystal polymer particle whose aspect ratio that is a ratio of a length in a longitudinal direction to a fiber diameter is 10 times or more. The length in the longitudinal direction and the fiber diameter of the fibrous particle can be measured from image data of the fibrous particles obtained when the fibrous particles are observed with a scanning electron microscope.

In the liquid crystal polymer powder according to the present embodiment, an average diameter of the fiber portion is 1 µm or less. The value of the average diameter of the fiber portion is an average value of the fiber diameters in a plurality of fibrous particles constituting the fiber portion. As described above, the liquid crystal polymer powder according to the present embodiment contains microfibrous particles.

The lump portion is a substantially unfiberized liquid crystal polymer powder. The lump portion may have a flat outer shape. In the liquid crystal polymer powder according to the present embodiment, a content of the lump portion is 20% or less. That is, the liquid crystal polymer powder according to the present embodiment has a relatively low content of the lump portion, or the liquid crystal polymer powder according to the present embodiment does not contain the lump portion. The content of the lump portion is evaluated by the number of the lump portion with respect to the number of the aggregation portions contained in the liquid crystal polymer powder. In the present embodiment, an aggregation portion having a maximum height of more than 10 μm when the liquid crystal polymer powder is placed on a flat surface is the lump portion, and an aggregation portion having a maximum height of 10 μm or less is the fiber portion.

As described above, in the present embodiment, a fine fibrous liquid crystal polymer powder is obtained in which the average diameter of the fiber portion in the liquid crystal polymer powder is 1 μm or less, the content of the lump portion is 20% or less, a fibrous raw material is not used, and the content of the lump portion is low. The liquid crystal polymer powder in which the average diameter of the fiber portion is 1 μm or less and the content of the lump portion is 20% or less has a high tensile elastic modulus and a large surface area. Thus, the liquid crystal polymer powder according to the present embodiment is suitable as a filler added to a coating film for reinforcement because adhesion to other members is easily obtained.

The liquid crystal polymer powder according to the present embodiment is made of a thermotropic liquid crystal polymer. The liquid crystal polymer powder according to the present embodiment has an endothermic peak temperature measured using a differential scanning calorimeter that exceeds 330° C. after being heated to 400° C. in an inert atmosphere, then cooled to room temperature at a temperature decreasing rate of 40° C./min or more, and heated again at a temperature increasing rate of 40° C./min. Thus, the liquid crystal polymer powder according to the present embodiment has high heat resistance and can be used as an electronic material. In the present specification, the endothermic peak temperature measured as described above may be simply referred to as a "melting point".

In the liquid crystal polymer powder according to the present embodiment, a value of D50 measured by particle size measurement using a particle size distribution measuring device by a laser diffraction scattering method is preferably 13 μm or less.

<Method of Producing Liquid Crystal Polymer Powder>

Hereinafter, a method of producing a liquid crystal polymer powder according to an embodiment of the present invention will be described. The method of producing a liquid crystal polymer powder according to an embodiment of the present invention includes a coarse grinding step, a fine grinding step, a coarse particle removal step, and a fiberizing step in this order.

In the coarse grinding step, first, a molded product of a liquid crystal polymer is prepared as a raw material. Examples of the molded product of the liquid crystal polymer include pelletized liquid crystal polymer uniaxially oriented, a film-shaped liquid crystal polymer biaxially oriented, and a powder-shaped liquid crystal polymer. As the molded product of the liquid crystal polymer, a pelletized or powdery liquid crystal polymer is preferable, and the pelletized liquid crystal polymer is more preferable from the viewpoint of production cost and the like. In the present embodiment, the molded product of the liquid crystal polymer does not contain a fibrous liquid crystal polymer directly molded by an electrolytic spinning method, a melt blowing method, or the like. However, the molded product of the liquid crystal polymer may contain a liquid crystal polymer processed into a fibrous form by crushing a pelletized liquid crystal polymer or a powdery liquid crystal polymer.

The melting point of the molded product of the liquid crystal polymer is preferably higher than 330° C., and more preferably 350° C. or higher. Thus, a highly heat resistant liquid crystal polymer powder suitable as a material for an electronic component can be obtained.

In the molded product of the liquid crystal polymer, the film-shaped liquid crystal polymer is usually molded using a melt extrusion method. However, when an attempt is made to mold a film-shaped liquid crystal polymer by the melt extrusion method for the liquid crystal polymer having a melting point of higher than 330° C., a large amount of fish-eyes of the liquid crystal polymer is generated, or degradation due to decomposition occurs. This is because when a film-shaped liquid crystal polymer is to be molded by the melt extrusion method for the liquid crystal polymer having a melting point of higher than 330° C., it is necessary to heat the liquid crystal polymer to a temperature close to a decomposition temperature and continuously knead the liquid crystal polymer. For this reason, a film-shaped liquid crystal polymer having a melting point of higher than 330° C. cannot be used as the molded product of the liquid crystal polymer.

Next, the molded product of the liquid crystal polymer is coarsely ground to obtain a coarsely ground liquid crystal polymer. For example, the molded product of the liquid crystal polymer is coarsely ground with a cutter mill device to obtain a coarsely ground liquid crystal polymer. The size of a particle of the coarsely ground liquid crystal polymer is not particularly limited as long as the particle can be used as a raw material for the fine grinding step described later. A maximum particle diameter of the coarsely ground liquid crystal polymer is, for example, 3 mm or less.

The method of producing a liquid crystal polymer powder according to the present embodiment may not necessarily include the coarse grinding step. For example, if the molded product of the liquid crystal polymer can be used as a raw material for the fine grinding step, the molded product of the liquid crystal polymer may be directly used as the raw material for the fine grinding step.

In the fine grinding step, the coarsely ground liquid crystal polymer as the liquid crystal polymer is ground in a state of being dispersed in liquid nitrogen to obtain a granular finely ground liquid crystal polymer. In the fine grinding step, the coarsely ground liquid crystal polymer dispersed in liquid nitrogen is ground using a medium. The medium is, for example, a bead. In the fine grinding step of the present embodiment, it is preferable to use a bead mill having relatively few technical problems from the viewpoint of handling liquid nitrogen. Examples of an apparatus that can be used in the fine grinding step include "LNM-08" that is a liquid nitrogen bead mill manufactured by IMEX Co., Ltd.

In the fine grinding step of the present embodiment, a grinding method in which the liquid crystal polymer is ground in the state of being dispersed in liquid nitrogen is different from a conventional freeze grinding method. Although the conventional freeze grinding method is a method of grinding a ground raw material while pouring liquid nitrogen onto the ground raw material and a grinder main body, the liquid nitrogen is vaporized at the time when the ground raw material is ground. That is, in the conventional freeze grinding method, the ground raw material is not dispersed in the liquid nitrogen at the time when the ground raw material is ground.

In the conventional freeze grinding method, heat of the ground raw material itself, the heat generated from the grinder, and the heat generated by grinding the ground raw material vaporize liquid nitrogen in an extremely short time. Thus, in the conventional freeze grinding method, the raw material during grinding located inside the grinder has a temperature much higher than −196° C., which is the boiling point of liquid nitrogen. That is, in the conventional freeze grinding method, grinding is performed under the condition that an internal temperature of the grinder is usually about 0° C. to 100° C. In the conventional freeze grinding method, when liquid nitrogen is supplied as much as possible, the temperature inside the grinder is approximately −150° C. at the lowest temperature.

For this reason, in the conventional freeze grinding method, for example, when a coarsely ground product of a pelletized liquid crystal polymer uniaxially oriented or a pelletized liquid crystal polymer is ground, grinding proceeds along a plane substantially parallel to an axial direction of a molecular axis of the liquid crystal polymer, and therefore, a fibrous liquid crystal polymer having a large aspect ratio and a fiber diameter much larger than 1 μm is obtained. That is, in a conventional freeze grinding direction, when the coarsely ground product of the pelletized liquid crystal polymer uniaxially oriented or the pelletized liquid crystal polymer is ground, a granular finely ground liquid crystal polymer cannot be obtained.

In the present embodiment, since the ground raw material is ground in the state of being dispersed in liquid nitrogen, the raw material in a further cooled state can be ground as compared with the conventional freeze grinding method. Specifically, the ground raw material can be ground at a temperature lower than −196° C., which is the boiling point of liquid nitrogen. When the ground raw material having a temperature lower than −196° C. is ground, brittle fracture of the ground raw material is repeated, so that the grinding of the raw material proceeds. As a result, for example, when a uniaxially oriented liquid crystal polymer is ground, not only fracture in the plane substantially parallel to the axial direction of the molecular axis of the liquid crystal polymer progresses, but also the brittle fracture progresses along a plane intersecting the axial direction, so that a granular finely ground liquid crystal polymer can be obtained.

In the fine grinding step in the present embodiment, the liquid crystal polymer formed into granules by brittle fracture in liquid nitrogen is continuously subjected to impact with a medium or the like in a brittle state. Thus, in the liquid crystal polymer obtained in the fine grinding step in the present embodiment, a plurality of fine cracks are formed from the outer surface to the inside.

The granular finely ground liquid crystal polymer obtained by the fine grinding step preferably has a D50 of 50 μm or less as measured by a particle size distribution measuring device by a laser diffraction scattering method. This makes it possible to suppress clogging of the granular finely ground liquid crystal polymer with the nozzle in the following fiberizing step.

In the present embodiment, in the coarse particle removal step, coarse particles are removed from the granular finely ground liquid crystal polymer obtained in the fine grinding step. For example, by sieving the granular finely ground liquid crystal polymer with a mesh, a granular finely ground liquid crystal polymer under a sieve is obtained, and by removing the granular liquid crystal polymer on the sieve, coarse particles contained in the granular finely ground liquid crystal polymer can be removed. The type of mesh may be appropriately selected, and examples of the mesh include a mesh having an opening of 53 μm. The method of producing a liquid crystal polymer powder according to the present embodiment may not necessarily include the coarse particle removal step.

In the fiberizing step, the granular liquid crystal polymer is crushed by a wet high-pressure crushing device to obtain a liquid crystal polymer powder. In the fiberizing step, first, a finely ground liquid crystal polymer is dispersed in a dispersion medium. In the finely ground liquid crystal polymer to be dispersed, although coarse particles may not be removed, it is preferable that the coarse particles are removed. Examples of the dispersion medium include water, ethanol, methanol, isopropyl alcohol, toluene, benzene, xylene, phenol, acetone, methyl ethyl ketone, diethyl ether, dimethyl ether, hexane, and mixtures thereof.

Next, the finely ground liquid crystal polymer in a state of being dispersed in the dispersion medium, that is, the slurry-like finely ground liquid crystal polymer is passed through the nozzle in a state of being pressurized at high pressure. By allowing the liquid crystal polymer to pass through the nozzle at a high pressure, a shearing force or collision energy due to high-speed flow in the nozzle acts on the liquid crystal polymer, and the granular finely ground liquid crystal polymer is crushed, so that the fiberization of the liquid crystal polymer proceeds, and the liquid crystal polymer powder according to the present embodiment can be obtained. A nozzle diameter of the nozzle is preferably as small as possible within a range in which clogging of the finely ground liquid crystal polymer does not occur in the nozzle from the viewpoint of imparting a high shear force or a high collision energy. Since the granular finely ground liquid crystal polymer in the present embodiment has a relatively small particle diameter, the nozzle diameter in the wet high-pressure crushing device used in the fiberizing step can be reduced. The nozzle diameter is, for example, 0.2 mm or less.

In the present embodiment, as described above, a plurality of fine cracks are formed in the granular finely ground liquid crystal polymer powder. Thus, the dispersion medium enters the inside of the finely ground liquid crystal polymer from fine cracks by pressurization in a wet high-pressure disperser. Then, when the slurry-like finely ground liquid crystal polymer passes through the nozzle and is located under normal pressure, the dispersion medium that has entered the inside of the finely ground liquid crystal polymer expands in a short time. The dispersion medium that has entered the inside of the finely ground liquid crystal polymer expands, whereby fracture progresses from the inside of the finely ground liquid crystal polymer. Thus, fiberization proceeds to the inside of the finely ground liquid crystal polymer, and the molecules of the liquid crystal polymer are separated per domain arranged in one direction. As described above, in the fiberizing step according to the present embodiment, by defibrating the granular finely ground liquid crystal polymer obtained in the fine grinding step in the present embodiment, it is possible to obtain the liquid crystal polymer powder according to the present embodiment which has a low content of the lump portion and is in the fine fibrous form as compared with the liquid crystal polymer powder obtained by crushing the granular liquid crystal polymer obtained by the conventional freeze grinding method.

In the fiberizing step in the present embodiment, the finely ground liquid crystal polymer may be crushed by a wet high-pressure crushing device to obtain the liquid crystal polymer powder. The number of times of crushing by the wet high-pressure crushing device is preferably small. The number of times of crushing by the wet high-pressure crushing device may be, for example, five times or less.

As described above, the method of producing a liquid crystal polymer powder according to an embodiment of the present invention includes the fine grinding step and the fiberizing step. In the fine grinding step, a liquid crystal polymer is ground in a state of being dispersed in liquid nitrogen to obtain a granular finely ground liquid crystal polymer. In the fiberizing step, the finely ground liquid crystal polymer is crushed by a wet high-pressure crushing device to obtain a liquid crystal polymer powder. Thus, when a liquid crystal polymer other than the fibrous liquid crystal polymer is used as a raw material, a fine fibrous liquid crystal polymer powder having a low content of the lump portion can be obtained.

In the production method for the liquid crystal polymer powder according to an embodiment of the present invention, the liquid crystal polymer dispersed in liquid nitrogen is ground using a medium in the fine grinding step. Thus, a raw material dispersed in the liquid nitrogen can be ground with a simple configuration.

EXAMPLES

Hereinafter, the present invention will be described in more detail using examples with reference to the drawings, but the present invention is not limited thereto.

Example 1

In Example 1, first, a film-shaped liquid crystal polymer having a thickness of 250 μm and molecules biaxially oriented in a plane direction was coarsely ground by charging the liquid crystal polymer into a cutter mill device. The melting point of the liquid crystal polymer used in Example 1 was 315° C. The coarsely ground film-shaped liquid crystal polymer was discharged from a discharge hole having a diameter of 3 mm provided in a cutter mill device to obtain a coarsely ground liquid crystal polymer.

Next, the coarsely ground liquid crystal polymer was finely ground with a liquid nitrogen bead mill (LNM-08 manufactured by IMEX Co., Ltd.). In the grinding with the liquid nitrogen bead mill, a vessel capacity was set to 0.8 L, zirconia beads having a diameter of 5 mm were used as media, an amount of the media charged was set to 500 mL, 30 g of the coarsely ground liquid crystal polymer was charged, and grinding treatment was performed at a rotation speed of 2000 rpm for 120 minutes. In the liquid nitrogen bead mill, the coarsely ground liquid crystal polymer was dispersed in liquid nitrogen to perform wet grinding treatment.

FIG. 1 is a photograph of a finely ground liquid crystal polymer after being ground in the fine grinding step in Example 1. As shown in FIG. 1, the coarsely ground liquid crystal polymer was ground in the liquid nitrogen bead mill to obtain a granular finely ground liquid crystal polymer. The photographs in FIG. 1 and FIG. 2 to FIG. 12 shown below were taken with a scanning electron microscope.

Next, the finely ground liquid crystal polymer was sieved with a mesh having an opening of 53 μm to remove coarse particles contained in the finely ground liquid crystal polymer, and the finely ground liquid crystal polymer having passed through the mesh was recovered. A yield of the finely ground liquid crystal polymer by the removal of coarse particles was 85% by mass.

Next, the finely ground liquid crystal polymer from which the coarse particles had been removed was dispersed in a 20 wt % ethanol aqueous solution. An ethanol slurry in which the finely ground liquid crystal polymer was dispersed was ground a plurality of times using a wet high-pressure crushing device under the conditions of a nozzle diameter of 0.2 mm and a pressure of 200 MPa to be formed into fibers. NanoVater (registered trademark) C-ES008 manufactured by Yoshida Kikai Co., Ltd. was used as the wet high-pressure crushing device.

Figure 2:
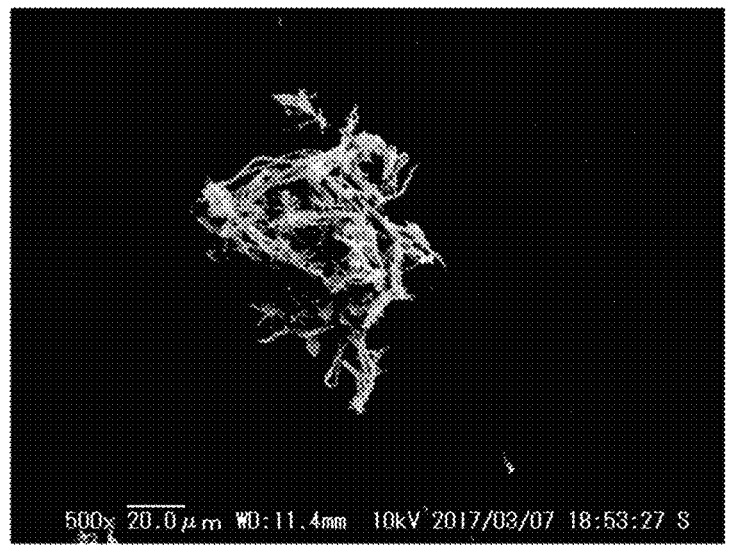
FIG. 2 is a photograph of a liquid crystal polymer powder after being repeatedly crushed five times in the fiberizing step in Example 1.

FIG. 2 is a photograph of the liquid crystal polymer powder after being repeatedly crushed five times in the fiberizing step in Example 1. As shown in FIG. 2, the finely ground liquid crystal polymer was ground to obtain a fine fibrous liquid crystal polymer powder.

Example 2

In Example 2, in place of the film-like liquid crystal polymer charged into the cutter mill device in Example 1, a pelletized liquid crystal polymer uniaxially oriented was charged into the cutter mill device to obtain a coarsely ground liquid crystal polymer. In Example 2, a liquid crystal polymer having a melting point of 315° C. was used. Then, finely grinding with a liquid nitrogen bead mill was performed in the same manner as in Example 1.

Figure 3:
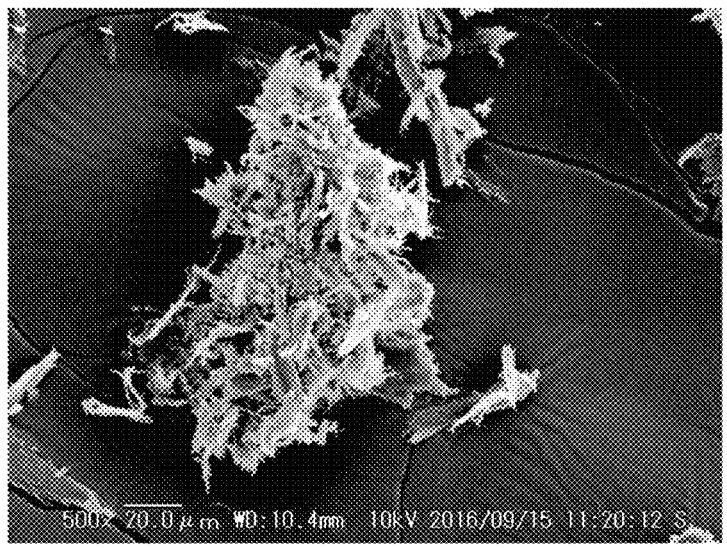
FIG. 3 is a photograph of a finely ground liquid crystal polymer after being ground in a fine grinding step in Example 2.

FIG. 3 is a photograph of the finely ground liquid crystal polymer after being ground in the fine grinding step in Example 2. As shown in FIG. 3, also in Example 2, the coarsely ground liquid crystal polymer was ground in the liquid nitrogen bead mill to obtain a finely ground liquid crystal polymer.

Figure 4:
FIG. 4 is a photograph of an internal section of the finely ground liquid crystal polymer after being ground in the fine grinding step in Example 2.

FIG. 4 is a photograph of an internal section of the finely ground liquid crystal polymer after being ground in the fine grinding step in Example 2. As shown in FIG. 4, it was confirmed that a large number of cracks were formed inside the finely ground liquid crystal polymer in Example 2.

Coarse particles contained in the finely ground liquid crystal polymer were removed in the same manner as in Example 1, and the finely ground liquid crystal polymer from which the coarse particles had been removed was crushed a plurality of times by a wet high-pressure crushing device to be formed into fibers.

Figure 5:
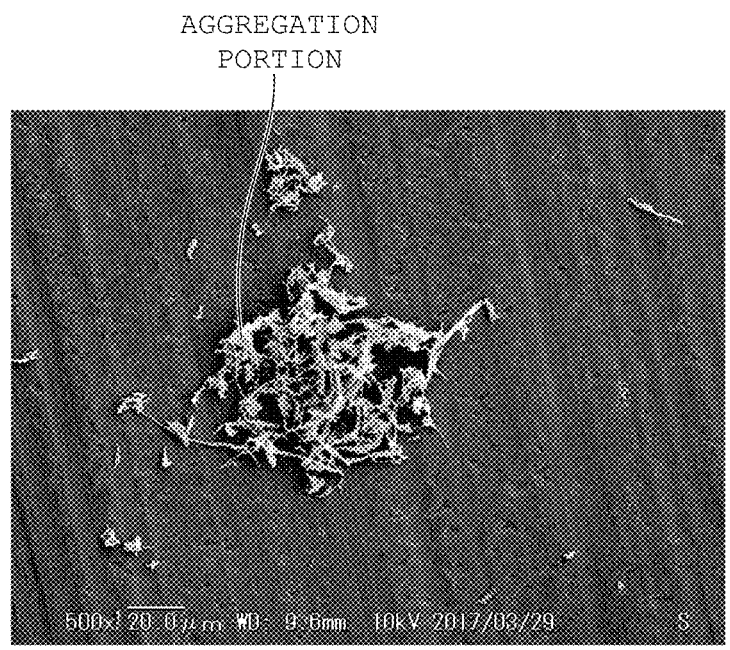
FIG. 5 is a photograph of the liquid crystal polymer powder after being repeatedly crushed five times in the fiberizing step in Example 2.

FIG. 5 is a photograph of the liquid crystal polymer powder after being repeatedly crushed five times in the fiberizing step in Example 2. As shown in FIG. 5, in Example 2, by crushing the finely ground liquid crystal polymer, a fine fibrous liquid crystal polymer powder was obtained without clogging the liquid crystal polymer in the nozzle of the wet high-pressure crushing device.

Example 3

In Example 3, in place of the film-like liquid crystal polymer charged into the cutter mill device in Example 1, a pelletized liquid crystal polymer uniaxially oriented was charged into the cutter mill device to obtain a coarsely ground liquid crystal polymer. In Example 3, unlike Examples 1 and 2, a liquid crystal polymer having a melting point of 350° C. was used. Then, finely grinding with a liquid nitrogen bead mill was performed in the same manner as in Examples 1 and 2.

Figure 6:
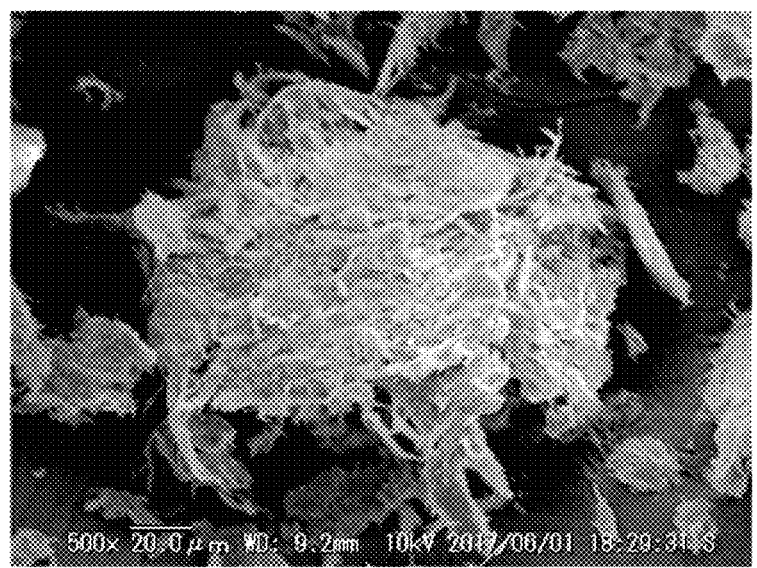
FIG. 6 is a photograph of the finely ground liquid crystal polymer after being finely ground in the fine grinding step in Example 3.

FIG. 6 is a photograph of the finely ground liquid crystal polymer after being finely ground in the fine grinding step in Example 3. As shown in FIG. 6, also in Example 3, the coarsely ground liquid crystal polymer was ground in the liquid nitrogen bead mill to obtain a granular finely ground liquid crystal polymer.

Coarse particles contained in the finely ground liquid crystal polymer were removed in the same manner as in Examples 1 and 2, and the finely ground liquid crystal polymer from which the coarse particles had been removed was crushed by a wet high-pressure crushing device to be formed into fibers.

Figure 7:
FIG. 7 is a photograph of the liquid crystal polymer powder after being repeatedly crushed five times in the fiberizing step in Example 3.

FIG. 7 is a photograph of the liquid crystal polymer powder after being repeatedly crushed five times in the fiberizing step in Example 3. As shown in FIG. 7, also in Example 3, by crushing the finely ground liquid crystal polymer, a fine fibrous liquid crystal polymer powder was obtained without clogging the liquid crystal polymer in the nozzle of the wet high-pressure crushing device. In addition, in Example 3, since the liquid crystal polymer powder that was not in the form of a film but in the form of pellets was used as a raw material, a liquid crystal polymer having a relatively high melting point could be employed as the liquid crystal polymer, and furthermore, a fine fibrous liquid crystal polymer powder having a high melting point could be obtained.

Comparative Example 1

In Comparative Example 1, first, a pelletized liquid crystal polymer uniaxially oriented was coarsely ground with a cutter mill device in the same manner as in Example 2 to obtain a coarsely ground liquid crystal polymer.

Next, the coarsely ground liquid crystal polymer was finely ground using a dry freeze grinder (Linlex Mill (registered trademark) manufactured by Hosokawa Micron Corporation). In this dry freeze grinder, liquid nitrogen was supplied to the inside of the apparatus together with the coarsely ground liquid crystal polymer. However, since the liquid nitrogen supplied to the inside of the apparatus is instantaneously vaporized, nitrogen exists as a gas inside the apparatus.

Figure 8:
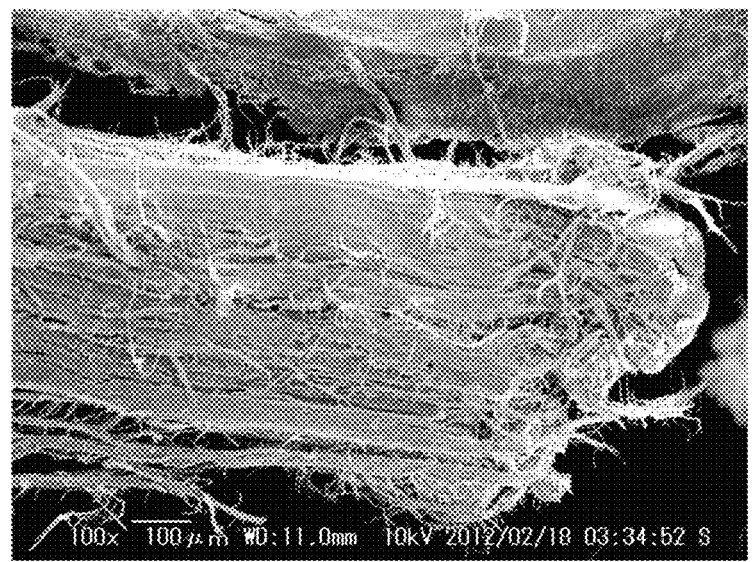
FIG. 8 is a photograph of the finely ground liquid crystal polymer after being ground in the fine grinding step in Comparative Example 1.

FIG. 8 is a photograph of the finely ground liquid crystal polymer after being ground in the fine grinding step in Comparative Example 1. As shown in FIG. 8, the finely ground liquid crystal polymer obtained by grinding the coarsely ground liquid crystal polymer with a dry freeze grinder was a fibrous liquid crystal polymer having a fiber diameter of several tens μm to several hundred μm.

In the present Comparative Example, the reason why the finely ground liquid crystal polymer becomes a fibrous liquid crystal polymer is considered as follows. When the pelletized liquid crystal polymer used in the present Comparative Example is produced, first, a melted liquid crystal polymer is extruded from a die to prepare a strand. In this strand, molecules constituting the liquid crystal polymer are strongly uniaxially oriented in a direction parallel to the extrusion direction due to a strong shear force accompanying the extrusion from the die. The strand is cut into a predetermined length to obtain a pelletized liquid crystal polymer. As a result, the pelletized liquid crystal polymer and the coarsely ground liquid crystal polymer obtained by coarsely grinding the pelletized liquid crystal polymer also have strong anisotropy because the molecules are uniaxially oriented. Thus, it is considered that in the conventional dry freeze grinder, the coarsely ground liquid crystal polymer was ground along the uniaxial orientation to obtain a fibrous liquid crystal polymer.

Next, the fibrous finely ground liquid crystal polymer having a fiber diameter of several tens μm to several hundred μm was sieved with a mesh having an opening of 53 μm to remove coarse particles, and the finely ground liquid crystal polymer having passed through the mesh was recovered. The yield of the finely ground liquid crystal polymer by the removal of coarse particles was 3% by mass. The finely ground liquid crystal polymer after the removal of coarse particles was also fibrous.

Figure 9:
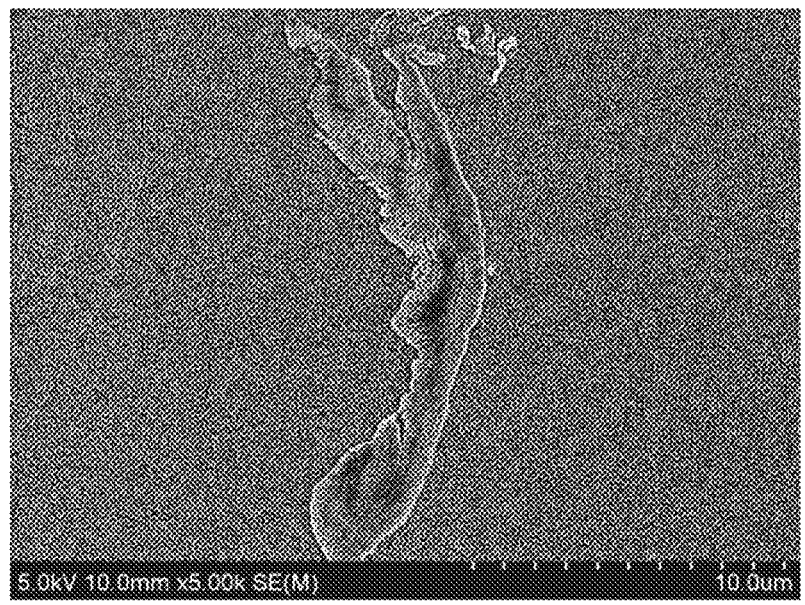
FIG. 9 is a photograph of an internal section of the finely ground liquid crystal polymer after being ground in the fine grinding step in Comparative Example 1.

FIG. 9 is a photograph of an internal section of the finely ground liquid crystal polymer after being ground in the fine grinding step in Comparative Example 1. As shown in FIG. 9, it was confirmed that the number of cracks inside the finely ground liquid crystal polymer in Comparative Example 1 was extremely smaller than the number of cracks inside the finely ground liquid crystal polymer in Example 2.

Next, the fibrous finely ground liquid crystal polymer from which the coarse particles had been removed was crushed by a wet high-pressure crushing device under the same conditions as in Example 2, that is, under the same conditions as in Example 1, and further fiberization of the finely ground liquid crystal polymer was attempted. However, in Comparative Example 1, a liquid crystal polymer powder could not be obtained because the fibrous finely ground liquid crystal polymer was clogged in the nozzle in the wet high-pressure crushing device.

Comparative Example 2

In Comparative Example 2, first, a film-like liquid crystal polymer biaxially oriented was coarsely ground with a cutter mill device in the same manner as in Example 1 to obtain a coarsely ground liquid crystal polymer. Then, the coarsely ground liquid crystal polymer was finely ground using the dry freeze grinder used in Comparative Example 1.

Figure 10:
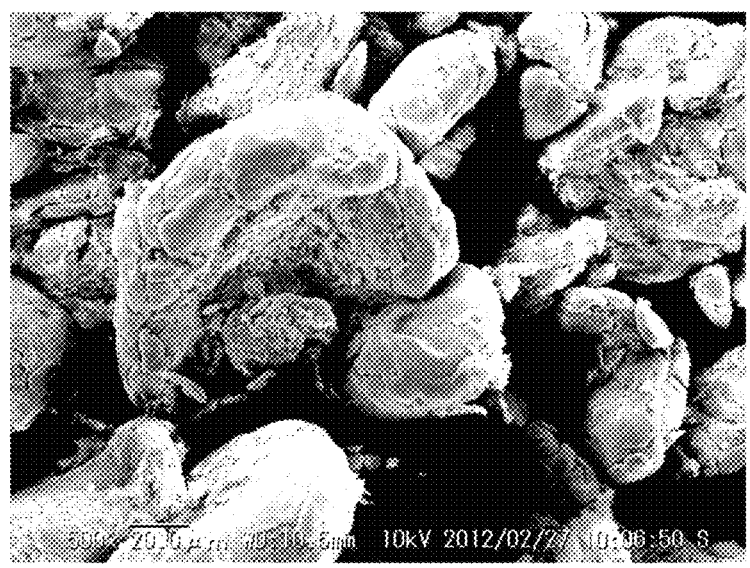
FIG. 10 is a photograph of the finely ground liquid crystal polymer after being ground in the fine grinding step in Comparative Example 2.

FIG. 10 is a photograph of the finely ground liquid crystal polymer after being ground in the fine grinding step in Comparative Example 2. As shown in FIG. 10, in Comparative Example 2, the coarsely ground liquid crystal polymer was finely ground using the dry freeze grinder to obtain a finely ground liquid crystal polymer.

Next, in the same manner as in Examples 1 to 3, coarse particles contained in the finely ground liquid crystal polymer were removed under the same conditions as in Examples 1 to 3, and the finely ground liquid crystal polymer from which the coarse particles had been removed was crushed by a wet high-pressure crushing device, thereby attempting fiberization.

Figure 11:
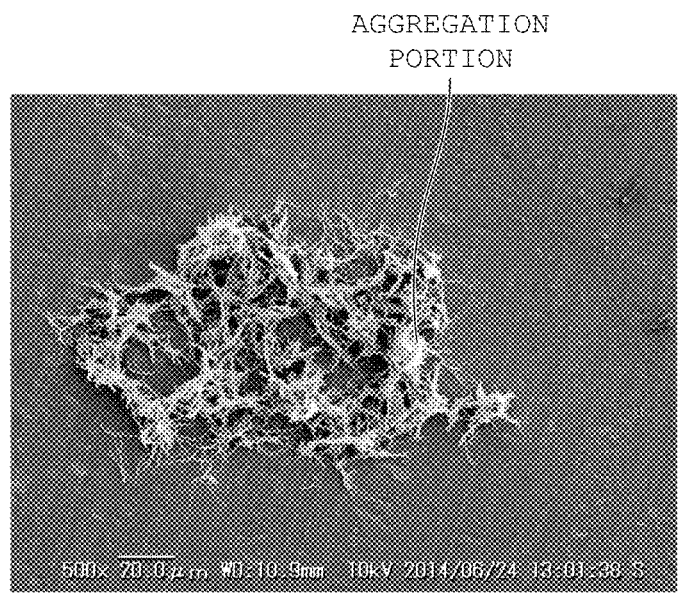
FIG. 11 is a photograph of the liquid crystal polymer powder after being repeatedly crushed seven times in the fiberizing step in Comparative Example 2.

FIG. 11 is a photograph of the liquid crystal polymer powder after being repeatedly crushed seven times in the fiberizing step in Comparative Example 2. As shown in FIG. 11, in Comparative Example 2, the finely ground liquid crystal polymer was ground to obtain a liquid crystal polymer powder. In Comparative Example 2, although a surface of the finely ground liquid crystal polymer could be fibrillated by crushing only once or twice, the entire finely ground liquid crystal polymer could not be formed into fine fibers.

[Measurement of Average Diameter of Fiber Portion]

In Examples 1 to 3 and Comparative Example 2, the average diameter of the fiber portion contained in the liquid crystal polymer powder obtained by fiberization using a wet high-pressure crushing device was measured.

In the measurement of the average diameter, first, a liquid crystal polymer powder to be measured was dispersed in ethanol to prepare a slurry containing a 0.01 wt % liquid crystal polymer powder. At that time, the slurry was prepared so that a moisture content in the slurry was 1 wt % or less. Then, 5 μL to 10 μL or less of this slurry was dropped onto a slide glass, and then the slurry on the slide glass was naturally dried. The liquid crystal polymer powder was disposed on the slide glass by naturally drying the slurry.

Figure 12:
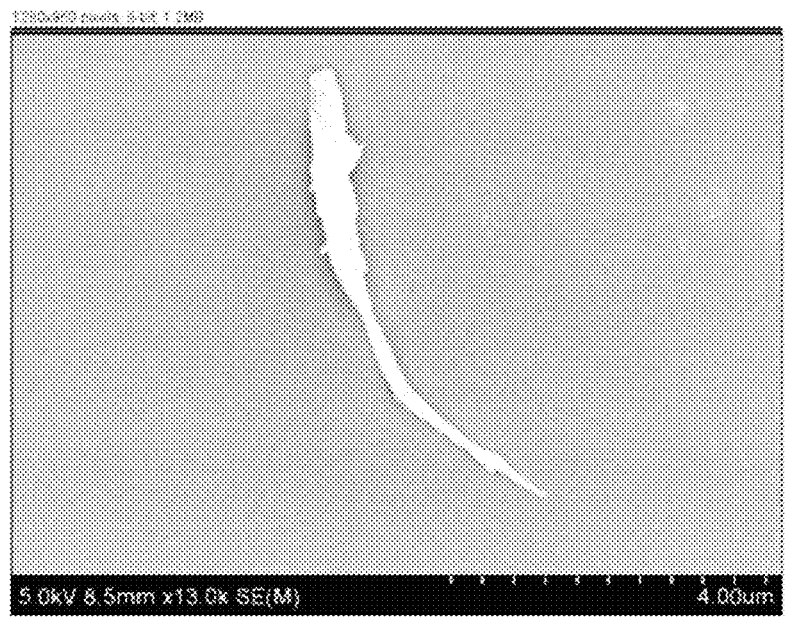
FIG. 12 is an image showing an example of a particle of the liquid crystal polymer powder taken to measure an average diameter of a fiber portion in the present example.

Next, a predetermined region of the liquid crystal polymer powder disposed on the slide glass was observed with a scanning electron microscope to collect 100 or more image data of the particles constituting the liquid crystal polymer powder. FIG. 12 is an image showing an example of the particle of the liquid crystal polymer powder taken to measure the average diameter of the fiber portion in the present example. As shown in FIG. 12, the particle of the liquid crystal polymer powder is shown in white.

In the collection of the image data, the region was set according to the size per particle of the liquid crystal polymer so that the number of image data was 100 or more. For each particle of the liquid crystal polymer, the image data was collected by appropriately changing the magnification of the scanning electron microscope to 500 times, 3,000 times, or 10,000 times in order to suppress leakage of the collection of the image data and occurrence of a measurement error.

Next, the longitudinal dimension and width direction dimension of each particle of the liquid crystal polymer powder were measured using the collected image data. The longitudinal direction was defined as a direction along the longest path among paths that can be taken on one particle of the liquid crystal polymer powder photographed in each of the pieces of image data, that is, paths that pass from one end of the particle through substantially the center of the particle and reach an end opposite to the one end. The length dimension of the longest path was measured as the longitudinal dimension. In addition, a particle dimension of one particle of the liquid crystal polymer powder in a direction orthogonal to the longitudinal direction was measured at three different points in the longitudinal direction. An average value of the dimensions measured at these three points was taken as the width direction dimension per particle of the liquid crystal polymer powder.

One particle of the liquid crystal polymer powder in which the longitudinal dimension was 10 times or more the width direction dimension was defined as a fibrous particle constituting the fiber portion. That is, the fiber diameter of the particles constituting the liquid crystal polymer powder in the fiber portion is the width direction dimension of the liquid crystal polymer powder. The fiber diameters of 100 fibrous particles constituting the fiber portion were measured. A value obtained by averaging the measurement results of these fiber diameters was taken as the average diameter of the fiber portion.

In at least Examples 1 to 3, it was confirmed that the average diameter of the fiber portions was 1 μm or less.

[Evaluation of Content of Lump Portion]

The content of the lump portion contained in the liquid crystal polymer powder was evaluated for the liquid crystal polymer powder obtained by performing crushing with the wet high-pressure crushing device five times in Examples 1 to 3, and for the liquid crystal polymer powder obtained by performing crushing with the wet high-pressure crushing device fifteen times in Comparative Example 2.

In the evaluation of the content of the lump portion, first, the liquid crystal polymer powder to be evaluated was collected in a slurry state immediately after being crushed by the wet high-pressure crushing device. Ethanol was additionally mixed with the collected slurry-like liquid crystal polymer powder to further dilute the slurry-like liquid crystal polymer powder. Ethanol was additionally mixed until the content of the liquid crystal polymer powder in the slurry was diluted to 0.01 wt % or less. Ethanol as a dispersion medium of the slurry was vaporized by dropping the diluted slurry onto a slide glass and then leaving it at normal temperature. In this way, the liquid crystal polymer powder was disposed on the glass slide.

Next, the liquid crystal polymer powder disposed on the slide glass was observed at a magnification of 100 times using a laser microscope (VK-8700 manufactured by KEYENCE CORPORATION). From this observation, it was confirmed that the liquid crystal polymer powder contained a plurality of aggregation portions in Examples 1 to 3 and Comparative Example 2. For example, the aggregation portion can also be confirmed by a scanning electron microscope. For example, as shown in FIG. 5 and FIG. 11, in Examples 1 to 3 and Comparative Example 2, the liquid crystal polymer powder includes the aggregation portion.

Figure 13:
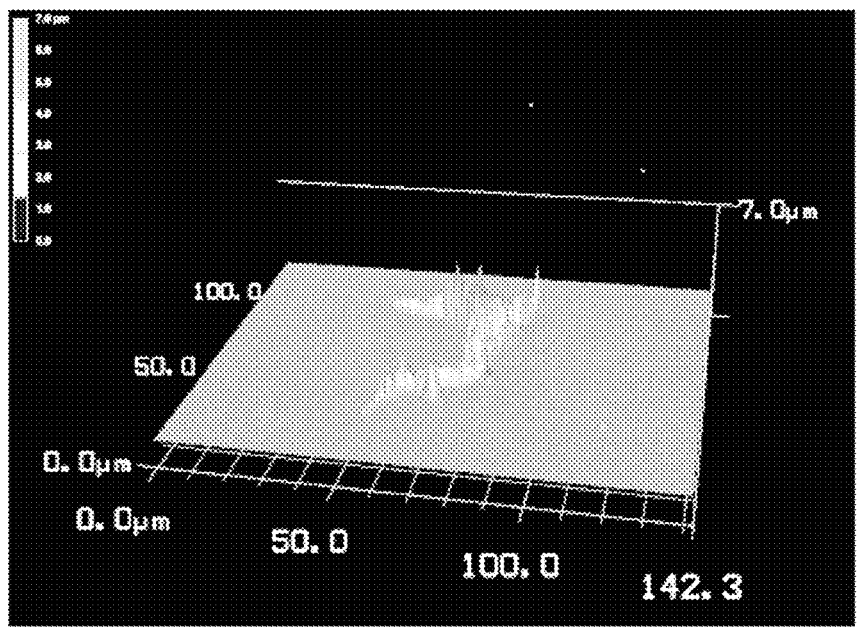
FIG. 13 is an example of a 3D analysis image of an aggregation portion of the liquid crystal polymer powder according to Example 1.
Figure 14:
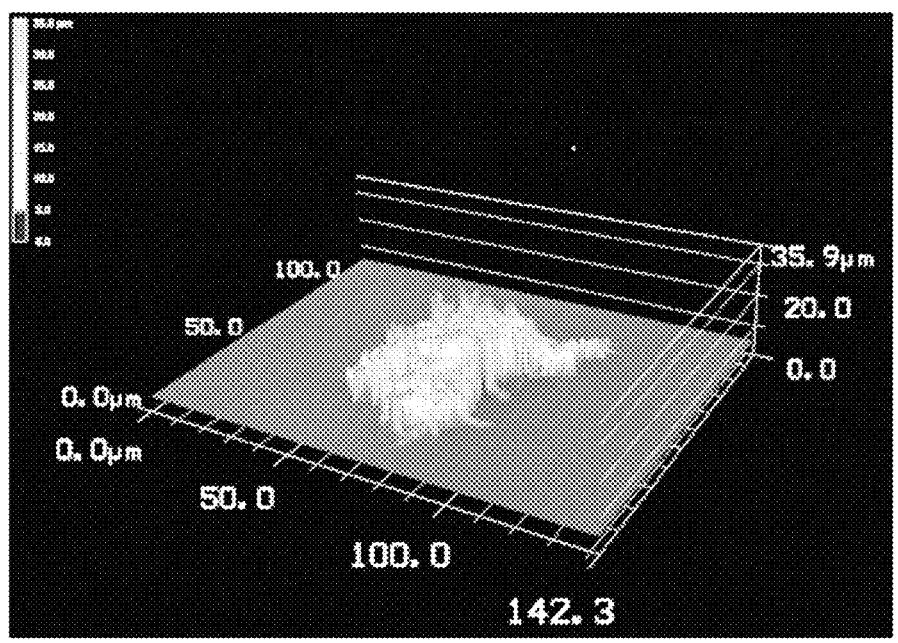
FIG. 14 is an example of a 3D analysis image of the aggregation portion of the liquid crystal polymer powder according to Comparative Example 2.

In the liquid crystal polymer powder to be measured, the maximum height of each of the plurality of aggregation portions was measured. A method of measuring the maximum height of the aggregation portion will be described below. First, for the aggregation portion disposed on the slide glass, a contour diagram of the height with the surface of the slide glass as a reference height was created using a data analysis application attached to the laser microscope. The contour diagram was created by correcting inclination of the slide glass so that the surface of the slide glass on the liquid crystal polymer powder side was horizontal. In addition, a 3D analysis image in which this contour diagram was displayed in 3D was output. FIG. 13 is an example of a 3D analysis image of the aggregation portion of the liquid crystal polymer powder according to Example 1. FIG. 14 is an example of a 3D analysis image of the aggregation portion of the liquid crystal polymer powder according to Comparative Example 2. As shown in FIG. 13 and FIG. 14, the overall height of the aggregation portion in Example 1 is greatly different from the overall height of the aggregation portion in Comparative Example 2.

For the liquid crystal polymer powder to be measured, 30 aggregation portions were selected by the microscope observation, and the maximum height was measured for each of these aggregation portions. In Examples 1 to 3, since it was confirmed that the average diameter of the fiber portion was 1 μm, the aggregation portion having the maximum height of 10 μm was determined to be a lump portion in which the liquid crystal polymer was not fibrous. In the liquid crystal polymer powder, a ratio of the number of the lump portions to 30 aggregation portions whose maximum height was measured was evaluated as the content of the lump portion contained in the liquid crystal polymer powder.

The details of the evaluation results of the contents of the lump portions in Example 1 and Comparative Example 2 are shown in Table 1 below. In Table 1 below, for each of Example 1 and Comparative Example 2, each of the selected 30 aggregation portions is numbered, and the result of measuring the maximum height of the aggregation portion according to each number is shown.

TABLE 1

| Measurement number | Example 1 | Comparative Example 2 |
|---|---|---|
| 1 | 0.8 | 15.6 |
| 2 | 1.3 | 5.1 |
| 3 | 1.8 | 8.3 |
| 4 | 1.4 | 7.9 |
| 5 | 1.9 | 22.2 |
| 6 | 6.0 | 3.7 |
| 7 | 3.9 | 19.5 |
| 8 | 1.1 | 25.9 |
| 9 | 1.1 | 11.8 |
| 10 | 1.7 | 12.1 |
| 11 | 1.9 | 22.9 |
| 12 | 1.1 | 26.8 |
| 13 | 0.8 | 10.5 |
| 14 | 2.6 | 15.1 |
| 15 | 2.0 | 6.1 |
| 16 | 10.3 | 8.9 |
| 17 | 1.6 | 13.4 |
| 18 | 1.7 | 39.5 |
| 19 | 1.8 | 14.6 |
| 20 | 2.2 | 31.1 |
| 21 | 5.2 | 11.7 |
| 22 | 4.5 | 21.5 |
| 23 | 2.7 | 35.5 |
| 24 | 5.4 | 7.7 |
| 25 | 2.8 | 9.3 |
| 26 | 2.5 | 7.7 |
| 27 | 0.5 | 5.6 |
| 28 | 0.7 | 12.6 |
| 29 | 3.5 | 16.6 |
| 30 | 2.5 | 14.2 |
| Average value of maximum height of aggregation portion ($\mu$m) | 2.6 | 15.4 |
| Number of lump portion | 1 | 20 |
| Content of lump portion (%) | 3.3 | 66.7 |

Also in Examples 2 and 3, the content of the aggregation portion was evaluated in the same manner as in Example 1 and Comparative Example 2. The evaluation results of the contents of the lump portions in Examples 1 to 3 and Comparative Example 2 are shown in Table 2 below.

TABLE 2

| Example 1 | Example 2 | Example 3 | Comparative Example 2 |
|---|---|---|---|
| 3.3% | 3.3% | 6.7% | 66.7% |

As shown in Table 1 and Table 2, in Examples 1, 2 and 3, the contents of the lump portions in the liquid crystal polymer powder were 3.3%, 3.3% and 6.7%, respectively, and were all 20% or less. On the other hand, in Comparative Example 2, the content of the lump portion in the liquid crystal polymer powder was more than 20% and 66.7%. That is, Comparative Example 2 contained a large amount of finely ground liquid crystal polymer which was not formed into fine fibers but remained granular.

[Particle Size Measurement]

In Examples 1 to 3 and Comparative Example 2, the finely ground liquid crystal polymer immediately after being finely ground in the fine grinding step, from which coarse particles have been removed and the fine fibrous liquid crystal polymer powder obtained by being crushed a predetermined number of times in the fiberizing step were subjected to particle size measurement to examine the value of D50. In Examples 1 to 3 and Comparative Example 2, the value of D50 was examined for the liquid crystal polymer obtained immediately after each of the first to fifth, tenth and fifteenth crushing in the fiberizing step.

In the particle size measurement, a particle size distribution measuring device (LA-950 manufactured by Horiba, Ltd.) by a laser diffraction scattering method was used. A liquid crystal polymer to be measured was dispersed using Ekinen as a dispersion medium. The liquid crystal polymer to be measured dispersed in the dispersion medium was subjected to ultrasonic treatment for 10 seconds, and then set in the particle size distribution measuring device to measure the particle size.

Figure 15:
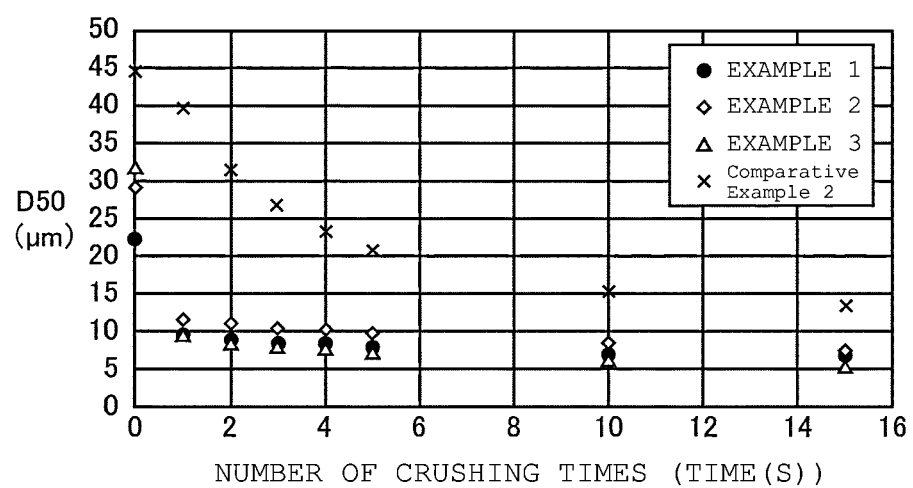
FIG. 15 is a graph showing a change in D50 of the liquid crystal polymer powder with respect to the number of crushing times in the fiberizing step in Examples 1 to 3 and Comparative Example 2.

FIG. 15 is a graph showing a change in D50 of the liquid crystal polymer powder with respect to the number of crushing times in the fiberizing step in Examples 1 to 3 and Comparative Example 2. In FIG. 15, the liquid crystal polymer crushed 0 times refers to a liquid crystal polymer before being crushed in the fiberizing step, that is, a finely ground liquid crystal polymer immediately after coarse particles are removed.

As shown in FIG. 15, in Example 1, the value of D50 of the finely ground liquid crystal polymer immediately after being finely ground and removing coarse particles was 23 $\mu$m. In Examples 1 to 3, D50 was significantly reduced in the first crushing as compared with Comparative Example 2. For example, in Example 1, D50 of the liquid crystal polymer was 9.3 $\mu$m in the first crushing. In Examples 1 to 3, since a finely ground liquid crystal polymer was obtained using a liquid nitrogen bead mill, the finely ground liquid crystal polymer was sufficiently brittle. For this reason, it is considered that the fine fiber formation in the fiberizing step proceeds rapidly, the entire fine powder liquid crystal polymer is formed into fine fiber by one crushing, and D50 is significantly reduced.

On the other hand, the value of D50 of the liquid crystal polymer in Comparative Example 2 was more than 9.3 $\mu$m, which was the value of D50 obtained by one crushing in Example 1, after 15 times of crushing. It is considered that in the liquid crystal polymer of Comparative Example 2, since embrittlement of the liquid crystal polymer in the fine grinding step is not sufficient, the fine fiber formation hardly proceeds in the fiberizing step performed after the fine grinding step.

In the description of the above embodiment, combinable configurations may be combined with each other.

The embodiments and working examples disclosed herein are all to be considered by way of example in all respects, but not limiting. The scope of the present invention is specified by the claims, but not the above description, and intended to encompass all modifications within the spirit and scope equivalent to the claims.

The invention claimed is:

1. A liquid crystal polymer powder comprising:
   a fiber portion including a fibrous liquid crystal polymer particle having an aspect ratio of 10 times or more, the aspect ratio being a ratio of a length in a longitudinal direction thereof to a fiber diameter,
   wherein an average diameter of the fiber portion is 1 $\mu$m or less, and a content of a substantially unfiberized lump portion is 20% or less.

2. The liquid crystal polymer powder according to claim 1, wherein the content of the substantially unfiberized lump portion is 0%.

3. The liquid crystal polymer powder according to claim 1, wherein the liquid crystal polymer powder is a thermotropic liquid crystal polymer.

4. The liquid crystal polymer powder according to claim 1, wherein the liquid crystal polymer powder has a D50 particle size of 13 $\mu$m or less.

5. The liquid crystal polymer powder according to claim 1, wherein the liquid crystal polymer has an endothermic peak temperature measured using a differential scanning calorimeter that exceeds 330° C. after being heated to 400° C. in an inert atmosphere, then cooled to room temperature at a temperature decreasing rate of 40° C./min or more, and heated again at a temperature increasing rate of 40° C./min.

* * * * *